(12) United States Patent
Koike et al.

(10) Patent No.: US 8,399,034 B2
(45) Date of Patent: Mar. 19, 2013

(54) MISO

(75) Inventors: Shin Koike, Tokyo (JP); Noboru Shirahata, Tokyo (JP); Koichi Okisaka, Tokyo (JP)

(73) Assignee: Kao Corporation, Tokyo (JP)

( * ) Notice: Subject to any disclaimer, the term of this patent is extended or adjusted under 35 U.S.C. 154(b) by 120 days.

(21) Appl. No.: 12/865,532

(22) PCT Filed: Jan. 31, 2008

(86) PCT No.: PCT/JP2008/051993
§ 371 (c)(1),
(2), (4) Date: Mar. 2, 2011

(87) PCT Pub. No.: WO2009/096042
PCT Pub. Date: Aug. 6, 2009

(65) Prior Publication Data
US 2011/0159151 A1 Jun. 30, 2011

(51) Int. Cl.
*A23L 1/20* (2006.01)
(52) U.S. Cl. .......................... 426/74; 426/634
(58) Field of Classification Search ............ 426/74, 426/634
See application file for complete search history.

(56) References Cited

U.S. PATENT DOCUMENTS

| 4,031,265 A | 6/1977 | Guadagni et al. |
| 4,154,862 A | 5/1979 | Guadagni et al. |

FOREIGN PATENT DOCUMENTS

| JP | 37-15295 | 9/1962 |
| JP | 41-4397 | 3/1966 |
| JP | 58-175464 | 10/1983 |
| JP | 63-279761 | 11/1988 |
| JP | 6-335362 | 12/1994 |
| JP | 8-196230 | 8/1996 |
| JP | 8-256725 | 10/1996 |
| JP | 8-283154 | 10/1996 |
| JP | 9-187244 | 7/1997 |
| JP | 9 187244 | 7/1997 |
| JP | 9-313127 | 12/1997 |
| JP | 10 99041 | 4/1998 |
| JP | 10-99041 | 4/1998 |
| JP | 11-318379 | 11/1999 |
| JP | 2000-78955 | 3/2000 |
| JP | 2000-78956 | 3/2000 |
| JP | 2000-236834 | 9/2000 |
| JP | 2000-245381 | 9/2000 |
| JP | 2001-190239 | 7/2001 |
| JP | 2001-240539 | 9/2001 |
| JP | 2002-47196 | 2/2002 |
| JP | 2004-49186 | 2/2004 |
| JP | 2004-290129 | 10/2004 |
| JP | 2005-168417 A | 6/2005 |
| JP | 2005-168458 | 6/2005 |
| JP | 2005-225847 | 8/2005 |
| JP | 2007 308414 | 11/2007 |
| JP | 2007-308414 | 11/2007 |
| JP | 2007 325588 | 12/2007 |
| JP | 2007-325588 | 12/2007 |
| JP | 2008 29341 | 2/2008 |
| JP | 2008-29341 | 2/2008 |
| TW | 200727794 A | 8/2007 |
| WO | WO 93/10677 | 6/1993 |
| WO | WO 98/18348 | 5/1998 |
| WO | WO 00/15237 | 3/2000 |

OTHER PUBLICATIONS

JP-H17-168417—Machine Translation.*
JP-H11-318379—Machine Translation.*
Yukiko Yamamoto, et al., "Antihypertensive Effect of Quercetin in Rats Fed with a High-Fat High-Sucrose Diet", Biosci. Biotechnol. Biochem., 70(4), 2006, pp. 933-939.
Yoshiharu Matsubara, et al., "Structure and Hypotensive Effect of Flavonoid Glycosides in Citrus Unshiu Peelings", Agric. Biol. Chem., 49(4), 1985, pp. 909-914.
A. Garg, et al., "Chemistry and Pharmacology of the Citrus Bioflavonoid Hesperidin", Phytotherapy Research, 15, 2001, pp. 655-669.
Yoshiaki Miyake, et al., "Lipid-Lowering Effect of Eriocitrin, the Main Flavonoid in Lemon Fruit, in Rats on a High-Fat and High-Cholesterol Diet", Journal of Food Science, vol. 71, No. 9, 2006, pp. S633-S637.
Written Opinion of the International Searching Authority issued Aug. 31, 2010, in Patent Application No. PCT/JP2008/051993 filed Jan. 31, 2008.
Japanese Office Action Issued Jul. 3, 2012 in Patent Application No. 2007-179970 (with English translation).
Soybean at http://microbewiki.kenyon.edu/index/php/Soybean accessed Sep. 20, 2012 9 pages.
Miso at http://en.wikipedia.org/wiki/Miso accessed Sep. 20, 2012 7 pages.
Nattō at http:en.wikipedia.org/wiki/Natt%C5%8D accessed Sep. 20, 2012 7 pages.
Chinese Office Action Issued May 15, 2012 in Patent Application No. 200880125965.6 (with English translation).

* cited by examiner

*Primary Examiner* — D. Lawrence Tarazano
*Assistant Examiner* — Hamid R Badr
(74) *Attorney, Agent, or Firm* — Oblon, Spivak, McClelland, Maier & Neustadt, L.L.P.

(57) ABSTRACT

The present invention provides miso containing a flavonoid substance having a flavanone, flavone, or flavonol skeleton in an amount of 0.01 to 5% by mass (weight).

12 Claims, No Drawings

MISO

FIELD OF THE INVENTION

The present invention relates to miso containing a flavonoid substance.

BACKGROUND OF THE INVENTION

Miso is a food made of soybeans and has an origin in ancient China. Ancient miso was introduced to Japan through the Korean Peninsula in the Yamato Court era and has been modified to be produced by Japanese original methods developed by Japanese with various efforts for fitting to Japanese climates, resulting in miso today. Miso is not just a seasoning but a good nutritious food and also a source of protein and fat. Further, intake of miso as miso soup can be a good way to eat vegetables, seaweed, and seafood used as ingredients in the miso soup. Miso is generally produced by adding rice and/or barley steamed and fermented with a koji mold to steamed soybean or grains such as rice and/or barley, mixing with a table salt, fermenting, and aging. Miso is known to develop its color during production and storage after production. A degree of coloring of miso is said to be varied according to starting materials, as well as conditions of aging (temperature and salt concentration) and sterilization by heating. Coloring is a complicated phenomenon involving various factors such as a temperature, a time (period), and a packaging material in storage, and a concentration of dissolved oxygen. A color tone of miso thus constantly changes in a series of processes from production to distribution, and to consumers, as well as to domestic storage. If miso cannot ensure its quality at a constant level as it has a varying color according to a time (season) when produced, the miso has a decreased commercial value. Keeping a color tone of miso is thus an important issue for miso manufacturers.

Under such a circumstance, there have been various methods proposed for preventing miso from coloring. These methods are classified broadly into four categories: (I) addition of other ingredients, (II) pretreatment of starting materials, (III) improvement in fermentation conditions, and (IV) others. Examples of a method of (I) include those of adding food additives such as alum, adding a sulfur-containing compound and a compound having an enediol structure, and adding extracts of Kihada (*Phellodendron amurense*), Kutinashi (*Gardenia jasminoides*), and/or Akane (*Rubia argyi*) to starting materials and fermenting a mixture (JP-B 41-4397, JP-B 37-15295, JP-A 2000-236834, JP-A 8-196230). Examples of a method of (II) include a method of processing starting soybeans with an enzyme. Examples of a method of (III) include a method of using a yeast having high temperature sensitivity. Examples of a method of (IV) include a method of using a gas-impermeable cup (JP-A 63-279761, JP-A 2000-245381, JP-A 58-175464).

In addition, there is an increasing interest in physiology of ingredients in foods. One of the materials having physiological functions is a group of flavonoids. Flavonoids are contained in vegetable foods, and known to have effects such as blood glucose level-reducing, hypotensive, lipid metabolism-improving, and allergy-inhibitory effects (JP-A 08-283154, JP-A 2001-240539, JP-A 2002-47196, JP-A 2005-225847, JP-A 2000-78955, JP-A 2000-78956, WO-A 00/15237, Biosci. Biotech. Biochem., 70(4), 933 (2006), Agric. Biol. Chem., 49(4), 909 (1985), Phytother. Res., 15, 655 (2001), J. Food Sci., 71, S633 (2006)).

There are also proposed methods for applying flavonoids to seasonings such as miso and foods (WO-A 98/18348, JP-A 2005-168458, JP-A 2004-290129, JP-A 9-187244). There are also methods of coloring miso to purple with sweet potato anthocyanins and coloring white miso to red with soy sauce and/or apple (JP-A 2001-190239, JP-A 9-313127). However, an effect of flavonoids to prevent color deepening (coloring) of miso is not known.

Although flavones having many methoxy residual groups are known to have effects of softening saltiness and controlling sweetness left thereby, flavonoids are not known to have effects of sustainability of saltiness. Flavonoids are further known to have effects of reducing sustainability of sweetness of high-intensity sweeteners, reducing green smell, astringent taste, and acid taste of vegetable drinks and herbal medicines, and reducing unfavorable tastes and flavors (JP-A 6-335362, JP-A 8-256725, JP-A 11-318379, WO-A 93/10677, U.S. Pat. Nos. 4,031,265, 4,154,862, JP-A 2004-49186).

SUMMARY OF THE INVENTION

The present invention provides miso containing a flavonoid substance having a flavanone skeleton, a flavone skeleton or a flavonol skeleton in an amount of 0.01 to 5% by mass (weight).

DETAILED DESCRIPTION OF THE INVENTION

For the issue of preventing miso from coloring, there are problems in the above-described prior methods (II) to (IV) that the methods have insufficient effects, equipment investments are required to increase production costs, and the methods include complicated steps. The prior method (I) proposed as a simple method sometimes impairs an original miso taste and has insufficient effects for preventing miso from coloring.

Therefore, the object of the present is to provide miso that is prevented from coloring (darkening its color), has good original miso taste without impaired, can be easily taken continuously, has physiological effects such as hypotensive effects, and can be easily produced.

The present inventors have investigated to solve the issue and found that addition of a flavonoid substance having a specific skeleton in a specific amount to miso conveniently provides miso that is prevented from coloring and has good original miso taste without impaired. The miso having good taste can be easily taken continuously, resulting in achievement of physiological effects such as hypotensive effects arising from the flavonoid.

According to the present invention, miso can be easily produced, that is prevented from coloring, has good original miso taste without impaired, can be easily taken continuously, and has physiological effects such as hypotensive effects.

As used herein, the "miso" includes normal and processed misos as are widely called. Examples of the normal miso include rice miso, barley miso, and bean miso, which names are derived from raw materials. Examples of the normal miso also include a blended miso of two or three of these misos, a nutrition-enriched miso containing an ingredient defined by food system with health claims, started on April 2001, at a certain standard lever or more, and a reduced-salt miso classified in the food for special dietary use described in Eihatsu No. 781. These normal misos may be raw or heated for sterilization. The processed miso refers miso used as not a seasoning but a food edible as is, including, for example, kinzanji miso, peanut miso, and yuzu miso.

The miso may be used as it is or as dried miso is. When the miso is not dried (in the state of semi-solid, in wet state), a water content thereof is 30 to 50% by mass (weight) (hereinafter, simply referred to as "%"), preferably 40 to 48%, and more preferably 42 to 47%. When dried (in the state of powder or granule, in dry state), a water content thereof is 2 to 7%, preferably 3 to 6%, and more preferably 4 to 5%.

Excessive dietary salt intake negatively affects kidney diseases, cardiac diseases, and hypertension. To control an amount of dietary salt intake, the miso of the present invention is preferably a low-salt or reduced-salt miso. As used herein, the reduced-salt miso refers that containing sodium in an amount equal to or less than 50% of a sodium content of a usual miso. The reduced-salt miso in a wet state preferably contains sodium in an amount of 2.1 to 2.55%, and more preferably 2.3 to 2.5%. The reduced-salt miso in a dry state preferably contains 4 to 5.5%, and more preferably 4.5 to 5%.

As used herein, the low-salt miso refers that containing sodium in an amount of more than 50% to not more than 80% of a sodium content of a usual miso. The low-salt miso in a wet state preferably contains sodium in an amount of more than 2.55% to less than 4.2%, and more preferably 3.5 to 4%. The low-salt miso in a dry state preferably contains more than 5.5% to less than 9%, and more preferably 6.5 to 7.9%.

In the present invention, the sodium refers "sodium" or "Na" on a table of food composition, and is contained in miso in the form of salt (the same is applicable to an alkaline metal or an alkaline earth metal other than sodium described below). Sodium is one of the important electrolytes for the human body, and is most found in extracellular fluid. A concentration thereof is hold at about 135 to 145 mol/L. Sodium occupies most of cations of extracellular fluid. Excessive sodium intake thus will be a major cause of hypertension due to water retention for holding a concentration.

The miso of the present invention contains sodium in an amount of 0.4 to 8%, preferably 1.4 to 7.4%, more preferably 2.2 to 6.2%, even more preferably 3.1 to 5.7%, even more preferably 3.6 to 5.4%, and even more preferably 3.8 to 5.1%, from the viewpoints of saltiness, storage stability, reduction of sodium intake, and industrial productivity.

In the present invention, for sodium, those can be used, including inorganic sodium salts, organic acid sodium salts, amino acid sodium salts, and nucleic acid sodium salts. Specific examples thereof include sodium chloride, sodium glutamate, sodium aspartate, sodium gluconate, sodium succinate, sodium inosinate, sodium guanylate, and mixtures thereof. Among them, from the viewpoint of production cost, dietary salts mainly composed of sodium chloride (NaCl) are preferably used.

Various dietary salts are commercially available. Examples of the commercial salt include, but not limited to, a table salt, an ordinary salt, which are available from Japan Tobacco Inc., and sun-dried salts imported from overseas. From the viewpoints of taste and industrial productivity, the dietary salt used preferably contains 0.01 to 2 parts by mass (weight) (hereinafter, simply referred to as "parts") of magnesium chloride, 0.01 to 2 parts of calcium chloride, and 0.01 to 2 parts of potassium chloride to 100 parts of sodium chloride, based on dry matter. In the present invention, a content of sodium can be measured with an atomic absorption spectrometer (polarized Zeeman atomic absorption spectrometer model Z-2000, Hitachi, Ltd.).

In brewing the miso of the present invention, usual koji can be used. Examples of the koji include rice koji, barley koji, and bean koji. They further include brewed miso of koji pre-treated by gelatinization, drying or the like of a koji other than the above shown grains, a raw material of koji or a koji before brewing.

In the miso of the present invention, usual raw materials can be used, including rice, barley and soybean. These raw materials may be pre-treated, for example, processed with a polysaccharide catabolic enzyme, treated with hot water, heated to cause protein denaturation, or sterilized.

In production of the miso of the present invention, a step of aging in brewing can be conducted under usual conditions. A period of the step may be a short time or a long time.

The miso of the present invention can be any of the normal miso, processed miso or blended miso, but must contain the flavonoid substance. A content thereof in the miso is 0.01 to 5%, preferably 0.06 to 4.5%, more preferably 0.08 to 4%, even more preferably 0.1 to 2%, and even more preferably 0.17 to 1%, from the viewpoints of effects of preventing coloring, holding an original miso taste, and physiological effects.

As used herein, the "coloring" refers "darkening a color" of miso during storage after production.

In the present invention, the flavonoid substance includes a flavonoid, a glycoside thereof (hereinafter, also referred to as "flavonoid glycoside" or simply "glycoside"), a product by further adding a sugar to a glycoside (since a glycoside is also a sugar-adduct, to distinguish between the glycoside and the product, hereinafter the product is referred to as "sugar-adduct"), and an enzyme-treated flavonoid. Flavonoids include flavones, flavonols, flavanones, flavanonols, and isoflavones in a narrow sense, and a series of compounds having a basic skeleton of $C_6$-$C_3$-$C_6$ in a broad sense including polymerized flavonoids of the narrow sense. In a molecule of flavonoid, benzene rings of both ends are named rings A and B, and a center pyran ring (or pyrone ring) are named ring C. The flavonoid includes also those having an OH group (hydroxy group) and an O-substituting group, binding to rings A and B of the molecule. ("Syokuhin no hensyoku no kagaku (Science in color change of foods)", Kimura Susum et al., eds., Korin Publishing Co., Ltd., 1995). In the present invention, flavonoids refer that of the broad sense, and preferably that of the narrow sense.

In the present invention, in the flavonoid substance, an aglycone (other than the glycoside) is referred to as a "flavonoid".

In the present invention, among flavonoids, preferred are those having an O (oxygen) atom binding to 4-position of ring C and (i) having no O (oxygen) atom binding to 3-position of ring C or (ii) having an O (oxygen) atom binding to 3-position of ring C with the proviso that the bonding between carbon atoms at 2- and 3-positions are a double bonding. Specific examples of the skeleton include a flavanone, a flavone, a flavonol, a flavanonol, and an isoflavone. From the viewpoints of taste and prevention of coloring, preferred are a flavanone, a flavone, and a flavonol skeletons.

Flavonoids also include those having one or more OH groups (hydroxy groups) and/or an $OCH_3$ group (methoxy group) bonding to rings A and B in the molecule. Among them, flavonoids particularly having hypotensive effects meet the purpose of the present invention and are preferred.

In the present invention, the flavonoid substance preferably has an $OCH_3$ group (methoxy group) bonding to ring A and/or B in the molecule, and more preferably satisfies formula (1), from the viewpoints of prevention of coloring and conservation of a miso original taste.

$$Y/(X+Y)=0.05 \text{ to } 1 \tag{1}$$

where,
X represents the number of OH group bonding to benzene rings in a molecule of the flavonoid substance; and
Y represents the number of $OCH_3$ group bonding to benzene rings in a molecule of the flavonoid substance.

In the present invention, a value of formula (1) is preferably 0.05 to 1, more preferably 0.1 to 0.7, even more preferably 0.15 to 0.5, even more preferably 0.2 to 0.45, even more preferably 0.25 to 0.4, and particularly preferably 0.27 to 0.35, from the viewpoints of prevention of coloring, conservation of a miso original taste, and addition of rich taste. Since an OH group bonding to ring A or B is particularly easy to be oxidized during storage, the flavonoid substance preferably has an $OCH_3$ group instead of the OH group, and more preferably satisfies formula (1) in the range described above. Specific examples of the aglycone satisfying formula (1) include pectolinarigenin, nobiletin, rhamnetin, isorhamnetin, tangeretin, sinensetin, isosinensetin, acacetin, and hesperetin. Specific examples of the glycoside satisfying formula (1) include hesperidin, methylhesperidin, neohesperidin, brassidin, narcissin, linaroside, diosmin, cacticin, and linarin.

In the present invention, from the viewpoints of prevention of coloring, taste, water-solubility, and industrial productivity, the flavonoid substance is preferably one compound or a mixture of two or more compounds, selected from hesperidin, methylhesperidin, neohesperidin, pectolinarigenin, nobiletin, brassidin, narcissin, linaroside, isorhamnetin, rhamnetin, cacticin, linarin, tangeretin, sinensetin, isosinensetin, diosmin, acacetin, and hesperetin, and sugar-adducts thereof, and sugar-adduct hydrolysate thereof, more preferably selected from hesperidin, methylhesperidin, neohesperidin, pectolinarigenin, isorhamnetin, rhamnetin, diosmin, and hesperetin, and sugar-adducts thereof, and sugar-adduct hydrolysate thereof, and even more preferably selected from hesperidin and hesperetin, and sugar-adducts thereof, and sugar-adduct hydrolysate thereof.

In the present invention, for the flavonoid substance, flavonoids having no OCH, group (methoxy group) binding to ring A or B in the molecule can be used. In the other words, a compound having a flavanone, flavone, or flavonol skeleton and a value of formula (1) of less than 0.05 can be used. Specific examples of an aglycone of such a flavonoid include quercetin, myricetin, kaemferol, luteolin, chrysin, naringenin, apigenin and eriodictyol. Specific examples of a glycoside of such a flavonoid include rutin, isoquercetin, quercitrin, isoquercitrin, hyperin, myricitrin, astragalin, naringin, apiin, eriocitrin, and neoeriocitrin.

In the present invention, from the viewpoints of prevention of coloring, taste, water-solubility, and industrial productivity, the flavonoid substance is preferably one compound or a mixture of two or more compounds, selected from rutin, quercetin, isoquercetin, quercitrin, hyperin, myricetin, myricitrin, kaemferol, luteolin, astragalin, chrysin, naringin, naringenin, apigenin, apiin, eriodictyol, eriocitrin, and neoeriocitrin, sugar-adducts thereof, and sugar-adduct hydrolysates thereof, more preferably selected from rutin, quercetin, chrysin, naringin, naringenin, apigenin, apiin, and eriocitrin, sugar-adducts thereof, and sugar-adduct hydrolysates thereof, and even more preferably selected from quercetin and rutin, sugar-adducts thereof, and sugar-adduct hydrolysates thereof.

In the present invention, from the viewpoint of solubility, the flavonoid substance preferably contains a flavonoid glycoside. A content of the glycoside in the flavonoid substance represented by formula (2) is preferably not less than 15%, more preferably not less than 35%, even more preferably not less than 50%, even more preferably 70 to 100%, even more preferably 80 to 99.9%, and particularly preferably 91 to 99%, from the viewpoints of taste and solubility.

$$\text{glycoside}/(\text{glycoside}+\text{aglycon})\times 100\ (\%) \qquad (2)$$

The flavonoid glycoside refers a compound composed of the flavonoid defined as above and a sugar binding thereto via glucoside bonding. A flavonoid without the sugar binding thereto refers an aglycone. There are two glycosides, O-glucoside having a sugar bonding to a hydroxy group in a flavonoid molecule via glucoside bonding and C-glucoside bonding to ring A or B ("Syokuhin no hensyoku no kagaku (Science in color change of foods)", Kimura Susum et al., eds., Korin Publishing Co., Ltd., 1995).

Examples of the sugar bonding to the flavonoid include, monosaccharides such as glucose, galactose, rhamnose, xylose, arabinose, and apiose, disaccharides such as rutinose, neohesperidose, sophorose, sambubiose, and laminaribiose, trisaccharides such as gentiotriose, glucosylrutinose, and glucosylneohesperidose, sugar-adducts thereof, and mixtures thereof. From the viewpoints of taste and water-solubility, sugar-adducts are preferably used.

The flavonoid glycoside is composed of the aglycone and the sugar bonding thereto, and preferably a flavanone glycoside, a flavone glycoside, or a flavonol glycoside, or a mixture thereof. From the viewpoints of taste and water-solubility, it is particularly preferable to use sugar-adducts of the flavonoid glycosides such as a glucose-adduct of hesperidin (trade name: αG-hesperidin PA-T, Toyo Sugar Refining Co. Ltd.). In the present invention, when the flavonoid substance contains a glycoside, a sugar composing the flavonoid glycoside preferably satisfies formula (3), from the viewpoint of storage stability.

$$R/Z=0\ \text{to less than}\ 0.5 \qquad (3)$$

where,
R represents a mole number of deoxy sugar in a mole of the flavonoid glycoside; and
Z represents total mole number of sugars constructing the flavonoid glycoside in a mole of the flavonoid glycoside.

In the present invention, a ratio of deoxy sugar can be reduced by further adding a sugar to the glycoside or removing the sugar, according to need. Examples of the deoxy sugar include rhamnose and fucose. Preferred is rhamnose.

In the present invention, the flavonoid substance preferably contains the flavonoid glycoside having a value of R/Z of 0 to less than 0.5 (formula (3)), more preferably 0.05 to 0.47, even more preferably 0.1 to 0.45, even more preferably 0.15 to 0.4, and even more preferably 0.2 to 0.38.

In the present invention, the flavonoid glycoside having a value of R/Z adjusted to 0 to less than 0.5 (formula (3)) is referred to as "sugar ratio-adjusted glycoside".

In the present invention, as the sugar ratio-adjusted glycoside, those can be used, including (a) a mixture of a glycoside and an aglycone, (b) a flavonoid substance having a hydrolyzed sugar group, and (c) an adduct of sugar to a flavonoid substance.

For (a), flavonoid mixtures containing glucose glycosides such as Cirsimarin (4'-[(β-D -Glucopyranosyl)oxy]-5-hydroxy-6,7-dimethoxyflavone), astragalin and/or flavonoid mixtures containing glucose glycosides and deoxy sugar-containing glycosides such as rutinose glycoside including hesperidin and diosmin for adjusting an R/Z ratio can be used.

For (b), a compound produced by hydrolyzing a sugar moiety of a flavonoid glycoside with an acid or an enzyme (glycoside sugar-hydrolysate) can be used. A glycoside sugar-hydrolysate with an acid can be produced by a method of Inaba et al., (Nihon Syokuhin Kougyou Gakkai Shi (Journal of food science and technology), Vol. 43 (11), p. 1212, (1996)). A glycoside sugar-hydrolysate with an enzyme can be produced by a method of Masukawa et al., (Nihon Syokuhin Kougyou Gakkai Shi (Journal of food science and technology), Vol. 32(12), p. 869 (1985)). In the present invention, the glycoside sugar-hydrolysate with an enzyme is preferably used.

For example, flavonoid mixtures containing glucose glycoside hydrolysates such as isosakuranetin-7-glucoside, isorhamnetin-3-glucoside, diosmetin-7-glucoside, and hesperetin-7-glucoside can be used. These glucose glycoside hydrolysates are produced by hydrolyzing rutinose glycosides and neohesperidose glycosides, such as neoponcirin (isosakuranetin-7-rutinoside), poncirin (isosakuranetin-7-neohesperidoside), narcissin (isorhamnetin-3-rutinoside), diosmin (diosmetin-7-rutinoside), neodiosmin (diosmetin-7-neohesperidoside), hesperidin (hesperetin-7-rutinoside), and neohesperidin (hesperetin-7-neohesperidoside). Flavonoid mixtures containing these hydrolysates and/or glucose glycosides and deoxy sugar-containing glycosides, such as rutinose glycoside, such as hesperidin or diosmin, for adjusting an R/Z ratio may also be used. In the present invention, a glycoside sugar-hydrolysate having an adjusted R/Z ratio by treating hesperidin with a hesperidinase is preferably used.

For (c), a product by adding a sugar to a glycoside at a sugar group thereof with an enzyme (sugar-adduct) can be used. The sugar-adduct with an enzyme can be produced by a method of Kometani et al., (Biosci. Biotech. Biochem., 58(11), 1990 (1994), Biosci. Biotech. Biochem., 60(4), 645 (1996)).

For example, flavonoid mixtures containing rutinose glycoside sugar-adducts such as glucosyl-neoponcirin, glucosyl-rhoifolin, glucosyl-narcissin, glucosyl-diosmin, glucosyl-hesperidin can be used. These rutinose glycoside sugar-adducts are produced by adding a sugar to rutinose glycosides such as neoponcirin (isosakuranetin-7-rutinoside), rhoifolin (apigenin-7-rutinoside), narcissin (isorhamnetin-3-rutinoside), diosmin (diosmetin-7-rutinoside), and hesperidin (hesperetin-7-rutinoside) at a sugar chain thereof.

Flavonoid mixtures containing neohesperidose glycoside sugar-adducts such as glucosyl-poncirin, glucosyl-neodiosmin, glucosyl-neohesperidin, glucosyl-naringin can also be used. These neohesperidose glycoside sugar-adducts are produced by adding a sugar to neohesperidose glycosides such as poncirin (isosakuranetin-7-neohesperidoside), neodiosmin (diosmetin-7-neohesperidoside), neohesperidin (hesperetin-7-neohesperidoside), and naringin (naringenin-7-neohesperidoside) at a sugar chain thereof. These flavonoid mixtures may be mixed with deoxy sugar-containing glycosides such as rutinose glycosides including hesperidin and diosmin to give flavonoid mixtures having an adjusted R/Z ratio. In the present invention, a hesperidin sugar-adduct (trade name: αG-hesperidin PA-T, Toyo Sugar Refining Co., Ltd., Y/(X+Y)=0.33, R/Z=0.36) is preferably used.

In the present invention, the flavonoid substance preferably contains a sugar ratio-adjusted glycoside having an R/Z value from 0 to less than 0.5. A content of the sugar ratio-adjusted glycoside in the flavonoid substance is preferably not less than 30%, more preferably 50 to 100%, even more preferably 70 to 97%, and even more preferably 75 to 95%.

In the present invention, to determine R/Z, a flavonoid glycoside is first treated with hydrochloride to hydrolyze a binding sugar ("Syokubutsu sikiso (plant pigment)", Hayashi Kouzou, Yokendo Co., Ltd., 1980). The sugar is then trimethylsilylated. A resultant mixture is quantified for the total sugars and a deoxy sugar by gas chromatography to determine R/Z ("Sogo Tatourui Kagaku—Jou—(general science of polysaccharides (first volume))", Harada Atsuya/Koizumi Takeo eds., Kodansha Ltd., 1973).

Furthermore, in the present invention, from the viewpoints of dispersibility and solubility in an aqueous solution and storage stability, the flavonoid substance having a value of formula (1) (Y/(X+Y)) in the range of 0.1 to 0.35 preferably has a value of R/Z of 0 to less than 0.45, and more preferably 0.1 to 0.4.

From the viewpoints of increased water-solubility and storage stability, the flavonoid substance having a value of (Y/(X+Y)) in the range of 0.36 to less than 1 preferably has a value of R/Z of 0 to 0.35, and more preferably 0.1 to 0.33.

In the present invention, a content of the flavonoid substance can be measured by high performance liquid chromatography ("Syokuhin no hensyoku no kagaku (Science in color change of foods)"), Kimura Susumu et al., eds., Korin Publishing Co., Ltd., 1995). For example, contents of hesperidin, rutin, quercetin, and the like can be measured according to methods described in publications (Biosci. Biotech. Biochem., 58(11), 1990 (1994), Biosci. Biotech. Biochem., 70(1), 178 (2006), J. Agric. Food Chem., 47(6), 2275 (1999)).

When the miso of the present invention is a reduced-salt or low-salt miso containing sodium in a small amount, from the viewpoint of enhancement of saltiness, the miso preferably further contains potassium. A content of potassium is preferably 0.4 to 10%, more preferably 0.7 to 5%, even more preferably 1 to 3.2%, even more preferably 1.1 to 2.4%, and even more preferably 1.3 to 1.8%, from the viewpoints of generating no offensive tastes derived from potassium such as bitter taste and irritating taste. From the viewpoint of presenting saltiness with small offensive taste, potassium is preferably potassium chloride. When potassium chloride is used, a content thereof is preferably 0.7 to 19%, more preferably 1.3 to 9.5%, even more preferably 1.9 to 6.1%, even more preferably 2.1 to 4.5%, and even more preferably 2.4 to 3.5%.

In the present invention, a content of potassium can be measured with an atomic absorption spectrometer (polarized Zeeman atomic absorption spectrometer model Z-2000, Hitachi, Ltd.).

The miso of the present invention can further contain other additives that can be used in foods such as a umami seasoning, an inorganic salt, an acidulant, amino acids, a nucleic acid, sugars, an excipient, a spice, seasonings other than the umami seasoning, an antioxidant, a colorant, a preservative, a reinforcing agent, an emulsifier, herbs, spices, and ethanol according to need, as well as the flavonoid substance.

When the miso of the present invention contains a umami seasoning, a content thereof in the miso is preferably 0.1 to 10%, more preferably 0.5 to 7%, even more preferably 1 to 5%, even more preferably 1.5 to 4%, and even more preferably 2 to 3.5% for giving a mild taste and a rich body. Examples of the umami seasoning include protein/peptide-based seasoning, amino acid-based seasoning, nucleic acid-based seasoning, extract-based seasoning and organic acid-based seasoning. Any of them can be used.

Examples of the extract-based seasoning that can be used include soup stocks prepared by extracting powders and shavings of dried fish flakes such as katsuobushi, munetabushi, magurobushi, ajibushi, sababushi, iwashibushi, and agobushi, and niboshis (dried baby fishes) prepared by drying sardine, mackerel, jack mackerel, flying fish and the like with water, hot water, alcohol, soy sauce, and the like, by extracting seaweeds such as kelp and mushrooms such as shiitake, by mixing these materials and extracting, and by mixing these extracts.

Examples of the nucleic acid-based seasoning include sodium, potassium, and calcium salts of yeast extracts, guanylic acid, inosinic acid, and the like. A content of the nucleic acid-based seasoning is preferably 0 to 0.2%, and more preferably 0.01 to 0.1%.

For the acidulant, lactic acid, acetic acid, succinic acid, malic acid, citric acid, tartaric acid, and the like can be used. Among them, preferred are lactic acid, malic acid, and citric acid, and more preferred is lactic acid. A content of lactic acid is preferably 0 to 2%, and more preferably 0.3 to 1%. A content of malic acid or citric acid is preferably 0 to 0.2%, and more preferably 0.02 to 0.1%. For the acidulant, vinegar and fruit juice may also be used according to need. From the viewpoint of taste, citrus juices such as yuzu (*Citrus junos*), daidai (*Citrus aurantium* var. *daidai*), sudachi (*Citrus sudachi*), kabosu (*Citrus sphaerocarpa* Hort), lemon are preferably used.

In the present invention, the miso may contain other substance having hypotensive effects, in addition to the flavonoid substance. Examples of the other substance having hypotensive effects include γ-aminobutyric acid, vinegar, nicotianamine, nucleic acid derivatives, soy sauce lees, sphingolipids, polyphenols, and angiotensin-converting enzyme inhibitory substances. A content of the other substance is preferably 0.05 to 5%, more preferably 0.2 to 3%, and even more preferably 0.5 to 2%, from the viewpoints of physiological function, taste, and stability.

In the present invention, the miso preferably contains a phosphoric compound. The phosphoric compound refers phosphoric acid, condensed phosphoric acid, derivatives thereof, salts thereof, and mixtures of two or more of these compounds. These phosphoric compounds are classified broadly into organic and inorganic phosphoric compounds. Examples of the organic phosphoric compound used in the present invention include phytic acid, derivatives thereof, and salts thereof. Examples of the inorganic phosphoric compound include phosphoric acid, pyrophosphoric acid, polyphosphoric acid, metaphosphoric acid, ultraphosphoric acid, derivatives thereof, and salts thereof. From the viewpoints of prevention of coloring and taste, among these compounds, preferred are phosphoric acid, polyphosphoric acid, pyrophosphoric acid, phytic acid, derivatives thereof, and slats thereof, more preferred are phosphoric acid, polyphosphoric acid, pyrophosphoric acid, and phytic acid, even more preferred are phytic acid and phosphoric acid, and even more preferred is phytic acid.

In the miso of the present invention, a content of the phosphoric compound is 0.005 to 2%, preferably 0.01 to 1.5%, more preferably 0.05 to 1%, and even more preferably 0.1 to 0.8%, from the viewpoints of taste and prevention of coloring, and in cases of using potassium together, from the viewpoint of reducing offensive tastes derived from potassium.

Particularly when the phosphoric compound is phytic acid, a content thereof is preferably 0.005 to 1.5%, more preferably 0.01 to 1%, even more preferably 0.05 to 0.8%, and even more preferably 0.07 to 0.5%, from the viewpoints of taste and prevention of coloring.

Particularly when the phosphoric compound is phosphoric acid, a content thereof is preferably 0.005 to 2%, more preferably 0.01 to 1.5%, even more preferably 0.05 to 1%, and even more preferably 0.07 to 0.8%, from the viewpoints of taste and prevention of coloring.

In the present invention, from the viewpoints of taste and prevention of coloring, an amount of the phosphoric compound is preferably 10 to 200 parts, more preferably 15 to 150 parts, even more preferably 18 to 130 parts, and even more preferably 20 to 100 parts to 100 parts of the flavonoid substance.

In the present invention, a content of the phosphoric compound can be measured with an atomic absorption spectrometer (polarized Zeeman atomic absorption spectrometer model Z-2000, Hitachi, Ltd.)("Shokuhin chu no syhokuhin tenkabutsu bunseki houhou (Analysis of food additives in foods)"), edited by Kouseisyo Kankyou Eiseikyoku Syokuhin Kagakuka (Ministry of Health, Labour and Welfare, Environmental Health Bureau, Food Chemistry Division), Kodansha Ltd., 1982).

In the present invention, from the viewpoint of prevention of coloring, the phosphoric compound is preferably used together with the flavonoid substance, and more preferably together with the flavonoid substance having a ratio of R/Z of 0 to less than 0.5, and even more preferably together with the flavonoid substance having a ratio of R/Z of 0 to less than 0.5 and a value of Y/(X+Y) of less than 0.05. In particularly preferred cases, phytic acid is used together with a sugar-ratio adjusted rutin and isoquercitrin (a ratio of R/Z of 0 to less than 0.5 and a value of Y/(X+Y) of less than 0.05)

In production of the miso of the present invention, the flavonoid substance may be added to raw materials before brewing or appropriately added to a raw miso produced by brewing and aging and mixed. It is also possible that sub-ingredients such as seasonings are mixed with a raw miso, stirred, kneaded with a mixing machine; treated miso is heated to deactivate enzymes in the miso and then the flavonoid substance is added and mixed. Considering effects of enzymes in brewing and aging and the like, the flavonoid substance is preferably added after aging, at the same time of adding sub-ingredients, or after firing. The flavonoid substance can be added in the state of powder as is, or in the state of solution or dispersion in water. In addition of the flavonoid substance in the state of powder, a particle size of the flavonoid substance is not specifically limited, but preferably small, because the smaller particles are more uniformly mixed and dispersed.

From the viewpoints of ease of handling and stability, the miso of the present invention is filled in a package to give a packaged miso. The package for filling preferably has a volume of 1 g to 25 kg, more preferably 15 g to 5 kg, even more preferably 50 g to 2 kg, even more preferably 100 g to 1 kg, and even more preferably 150 to 500 g, from the viewpoints of stability and ease of handling. To produce a packaged miso, a film wrapping material having high gas barrenness is used. Examples of the film wrapping material include those composed of poly(ethylene terephthalate)(PET)/ethylenevinyl alcohol polymer (Eval)/low-density polyethylene (PE) and of PET/aluminium/PE. Examples of other wrapping material include a PET wrapping material, a synthetic resin bag, a synthetic resin mold container, and a glass bottle. These may be in a usual form. In the present invention, the miso to be filled to give a packaged miso is preferably a wet miso (wet state).

The miso of the present invention can be for domestic use or professional use. For example, it can be used in various miso dishes, including miso soup, miso dengaku (sweet miso source), and miso ni (stew with miso). It can also be used to prepare processed miso foods, including seasoned miso, dengaku miso, miso soup stock for nabe (Japanese hot pot), soup for misonikomi udon (stewing udon noodle), soup for miso ramen (Japanese noodle with miso taste soup), and liquid miso.

Addition of the flavonoid substance to the miso of the present invention in a specific amount prevents coloring of the miso without modifying a taste of the miso, and can be easily intaken usually in meals of everyday life. The addition of the flavonoid substance also has an effect of improving hypertension due to physiological functions of the flavonoid substance. A package of the miso of the present invention thus can display claims such as "this product is suitable for those concerned about blood pressure", "this product is suitable for those having relatively high blood pressure", "this product has an effect of decreasing a blood pressure", and "this product has an effect of controlling a blood pressure".

EXAMPLES

The following Examples demonstrate the present invention. Examples are intended to illustrate the present invention and not to limit the present invention.
(1) Test Samples a1 to a20

The following miso and flavonoids were mixed in amounts shown in Table 1 and kneaded with a spatula to prepare test samples a1 to 20.

Miso
  reduced-salt miso: Oisiku enbun ½ miso (Marukome Co., Ltd.)

Flavonoids
1) chlorogenic acid: chlorogenic acid (Tokyo Chemical Industry Co., Ltd.)
2) grape seed polyphenol: Gravinol (Kikkoman Corporation)
3) catechin: Teafuran 90S (Ito En Ltd.)
4) isoflavone: isoflavone S (Fujicco Co., Ltd., isoflavone content: 10%)
5) quercetin: quercetin dihydrate (Wako Pure Chemical Industries, Ltd.)
6) rutin: rutin trihydrate (Wako Pure Chemical Industries, Ltd.)
7) chrysin: chrysin (Kanto Chemical Co., Inc.)
8) apigenin: apigenin (Wako Pure Chemical Industries, Ltd.)
9) naringin: naringin (Kanto Chemical Co., Inc.)
10) methylhesperidin: methylhesperidin (Alps Pharmaceutical Ind. Co., Ltd.)
11) hesperidin: hesperidin (Hamari Chemicals, Ltd.)
12) hesperetin: hesperetin (Kanto Chemical Co., Inc.)
13) hesperidin sugar-adduct: αG-hesperidin PA-T (Toyo Sugar Refining Co., Ltd., Y/(X+Y)=0.33, R/Z=0.36)
14) hesperidin sugar-hydrolysate: enzymatically hydrolyzed hesperidin A The enzymatically-hydrolyzed hesperidin A was prepared based on the publication of Masukawa et al. (supra). In particular, 1 g of hesperidin was dissolved in 1N NaOH, and adjusted its pH to 4 with 1N HCl. To the reaction mixture was added 1 g of hesperidinase (soluble Hesperidinase <Tanabe> No. 2, Mitsubishi Tanabe Pharma Corporation), and reacted for 4 hours at 50° C. The reaction mixture was filtered through a filter paper (Toyo No. 5). The filter paper was washed with distilled water. The filtrate and the washing water were collected. The collected mixture was neutralized with 1N NaOH, freeze-dried, and hydrolyzed with an enzyme to give the enzymatically hydrolyzed hesperidin A. Composition analysis by HPLC showed that: a 7-glucosyl-hesperetin content was 56.4%, a hesperetin content was 14.6%, a hesperidin content was 29.0% (Y/(X+Y)=0.33, R/Z=0.17).

[Evaluation of Samples]

Each 20 g of test samples a1 to a20 was spread all over the surface of IWAKI plastic sterile petri dish SH90-15 (shallow type, 90 by 15 mm) at a thickness of around 4 mm, and measured for its color tone with a miso color reader (Konica Minolta Sensing, Inc., Color Reader model CR-13). An L value indicating brightness was used as an index of coloring. A test sample was measured three times to determine an average L value. Then, the surface of the miso was covered with a plastic wrap (Saran Wrap, trade name) with no space therebetween such that the miso did not directly contact with the air. Covering with the plastic wrap assumed a packaged miso. The covered miso was allowed to stand in a thermostatic chamber (40° C./75% RH). After three days, the miso was left out from the plastic wrap and measured for its color tone. An initial L value of miso with no additive (control) was used as a standard value of 100 to determine relative values of samples. Results are shown in Table 1.

TABLE 1

|  | Test sample | Flavonoid | Flavonoid skelton | L value Measured value (initial stage) (after 3 days) | L value Relative value (initial stage) (after 3 days) |
|---|---|---|---|---|---|
| Reduced-salt miso | a1 | 0% without additive (control) | — | 44.4 / 35.3 | 100 / 79.5 |
|  | a2 | 0.5% chlorogenic acid | — | 41.6 / 33.6 | 93.7 / 75.7 |
|  | a3 | 0.5% grape seed polyphenol | flavanol | 39.8 / 32.3 | 89.6 / 72.7 |
|  | a4 | 0.3% catechin | flavanol | 36.0 / 31.6 | 81.1 / 71.2 |
|  | a5 | 3% isoflavone | isoflavone | 42.7 / 34.6 | 96.1 / 77.9 |
|  | a6 | 0.01% quercetin | flavonol | 43.7 / 36.0 | 98.4 / 81.8 |
|  | a7 | 0.07% quercetin | flavonol | 45.2 / 36.6 | 101.8 / 82.4 |
|  | a8 | 0.5% quercetin | flavonol | 52.0 / 43.5 | 117.1 / 98.0 |
|  | a9 | 0.5% rutin | flavonol | 47.8 / 39.7 | 107.7 / 81.4 |
|  | a10 | 0.07% chrysin | flavone | 44.8 / 36.9 | 100.9 / 83.1 |
|  | a11 | 0.1% chrysin | flavone | 45.1 / 35.8 | 101.6 / 85.4 |
|  | a12 | 0.5% chrysin | flavone | 47.7 / 39.2 | 107.4 / 88.3 |
|  | a13 | 1% chrysin | flavone | 50.5 / 42.9 | 113.7 / 96.6 |
|  | a14 | 0.1% apigenin | flavone | 46.2 / 37.2 | 100.7 / 81.0 |
|  | a15 | 0.4% naringin | flavanone | 45.4 / 36.4 | 102.3 / 82.0 |

TABLE 1-continued

| Test sample | Flavonoid | Flavonoid skelton | L value Measured value (initial stage) (after 3 days) | L value Relative value (initial stage) (after 3 days) |
|---|---|---|---|---|
| a16 | 0.3% methylhesperidin | flavanone | 44.3 | 99.8 |
|  |  |  | 35.7 | 80.4 |
| a17 | 0.3% hesperidin | flavanone | 44.5 | 100.2 |
|  |  |  | 36.3 | 81.8 |
| a18 | 0.3% hesperidin | flavanone | 45.4 | 102.3 |
|  |  |  | 36.8 | 82.9 |
| a19 | 0.3% hesperidin sugar-adduct | flavanone | 44.8 | 100.9 |
|  |  |  | 35.8 | 80.6 |
| a20 | 0.3% hesperidin sugar-hydrolysate | flavanone | 44.2 | 99.5 |
|  |  |  | 35.4 | 79.7 |

As shown in Table 1, L values of test samples a2 (with chlorogenic acid), a3 (with grape seed polyphenol), a4 (with catechin) and a5 (with isoflavone) had lower L values than the L value of test sample a1, which was a control of the reduced-salt miso, and they are unfavorable. In contrast, test samples a6 to a8 (with quercetin), a9 (with rutin), a10 to a13 (with chrysin), a14 (with apigenin), a15 (with naringin), a16 (with methylhesperidin), a11 (with hesperidin), a18 (with hesperetin), a19 (with hesperidin sugar-adduct), and a20 (including hesperidin sugar-hydrolysate) had L values equal to or higher than that of the control, being favorable.

It is shown in results that addition of catechin of a typical flavonoid (flavanol skeleton) darkened a color of the miso, resulting in a decreased L value, but addition of a specific flavonoid (having a flavonol, flavone or flavanone) prevented coloring of a miso while the miso contained the flavonoid.

(2) Test Samples b1 to b8 and c1 to c6

The following misos and flavonoids were mixed in amounts shown in Table 2 and kneaded with a spature to prepare test samples b1 to b8 and c1 to c6.

Miso
normal miso: Shinsyu-Ichi Miso Miko-Chan Jirushi (Miyasaka Brewery Co., Ltd.)
low-salt miso: Usushio Akadashi (Ichibiki Co., Ltd.)

Flavonoids
1) chlorogenic acid: chlorogenic acid (Tokyo Chemical Industry Co., Ltd.)
2) grape seed polyphenol: Gravinol (Kikkoman Corporation)
3) catechin: Teafuran 90S (Ito En Ltd.,)
4) chrysin: chrysin (Kanto Chemical Co., Inc.)
5) quercetin: quercetin dihydrate (Wako Pure Chemical Industries, Ltd.)
6) rutin: rutin trihydrate (Wako Pure Chemical Industries, Ltd.)
7) hesperidin: hesperidin (Hamari Chemicals, Ltd.)
8) hesperidin sugar-adduct: aG-hesperidin PA-T (Toyo Sugar Refining Co., Ltd., Y/(X+Y)=0.33, R/Z=0.36)

[Evaluation of Samples]
Prepared test samples b1 to b8 and c1 to c6 were evaluated for color tone in the same as samples of (1). Results are shown in Table 2.

TABLE 2

|  | Test sample | Flavonoid | Flavonoid skelton | L value Measured value (initial stage) (after 3 days) | L value Relative value (initial stage) (after 3 days) |
|---|---|---|---|---|---|
| Normal miso | b1 | 0% without additive (control) | — | 58.7 | 100 |
|  |  |  |  | 51.3 | 87.4 |
|  | b2 | 0.3% chlorogenic acid | — | 57.5 | 98.0 |
|  |  |  |  | 50.7 | 86.4 |
|  | b3 | 0.3% grape seed polyphenol | Flavanol | 52.8 | 89.9 |
|  |  |  |  | 45.7 | 77.9 |
|  | b4 | 0.3% catechin* | Flavanol | 46.8 | 79.7 |
|  |  |  |  | 44.7 | 76.1 |
|  | b5 | 0.3% chrysin | flavone | 59.7 | 101.7 |
|  |  |  |  | 53.0 | 90.3 |
|  | b6 | 0.3% quercetin | flavonol | 61.6 | 104.9 |
|  |  |  |  | 54.7 | 93.2 |
|  | b7 | 0.3% rutin | flavonol | 59.6 | 101.5 |
|  |  |  |  | 52.9 | 90.1 |
|  | b8 | 0.3% hesperidin | flavanone | 57.9 | 98.6 |
|  |  |  |  | 51.5 | 87.7 |
| Low-salt miso | c1 | 0% without additive (control) | — | 18.2 | 100 |
|  |  |  |  | 13.7 | 75.3 |
|  | c2 | 0.3% grape seed polyphenol | Flavanol | 18.0 | 98.9 |
|  |  |  |  | 13.2 | 72.5 |
|  | c3 | 0.3% chrysin | flavone | 19.9 | 109.3 |
|  |  |  |  | 14.7 | 80.8 |
|  | c4 | 0.3% quercetin | flavonol | 22.5 | 123.6 |
|  |  |  |  | 16.4 | 90.1 |

TABLE 2-continued

|  |  |  | L value | |
|---|---|---|---|---|
| Test sample | Flavonoid | Flavonoid skelton | Measured value (initial stage) (after 3 days) | Relative value (initial stage) (after 3 days) |
| c5 | 0.3% hesperidin | flavanone | 18.5<br>13.9 | 101.6<br>76.4 |
| c6 | 0.3% hesperidin sugar-adduct | flavanone | 18.4<br>14.0 | 101.1<br>76.9 |

As shown in Table 2, in the case of using a normal miso, L values of test samples b2 (with chlorogenic acid), b3 (with grape seed polyphenol) and b4 (with catechin) had lower L values than the L value of test sample b1 without flavonoid. It is meant that they are unfavorable by promotion of coloring. In contrast, test samples b5 (with chrysin), b6 (with quercetin), b7 (with rutin), and b8 (with hesperidin) has higher L values than that of test sample b1 (control), which results show favorable prevention of coloring.

In cases of using a low-salt miso, test sample c2 (with grape seed polyphenol) had a lower L value than test sample c1 without a flavonoid. In contrast, test samples c3 (with chrysin), c4 (with quercetin), c5 (with hesperidin), and c6 (with hesperidin sugar-adduct) had higher L values than that of test sample c1 (control), which results show prevention of coloring favorably.

Results show that addition of catechin of a typical flavonoid (flavanol skeleton) darkened color of miso, resulting in a decreased L value. Addition of a specific flavonoid (having a flavonol, flavone, or flavanone skeleton), on the other, prevented an L value of miso from decreasing, while the miso contained the flavonoid, resulting in a good color tone.

(3) Test Samples d1 to d8 and e1 to e8

The following misos and flavonoids and potassium chloride were mixed in amounts shown in Table 3 and kneaded with a spature to prepare test samples d1 to d8 and e1 to e8.
Miso
  low-salt miso: Takeya Miso Enbun Hikaeme (Takeya Miso Co., Ltd.)
  reduced-salt miso: Oisiku enbun ½ Miso (Marukome Co., Ltd.)
Potassium Chloride
  potassium chloride (Wako Pure Chemical Industries, Ltd.)
Flavonoids
1) catechin: Teafuran 90S (Ito En Ltd.,)
2) chrysin: chrysin (Kanto Chemical Co., Inc.)
3) quercetin: quercetin dihydrate (Wako Pure Chemical Industries, Ltd.)
4) rutin: rutin trihydrate (Wako Pure Chemical Industries, Ltd.)
5) hesperidin: hesperidin (Hamari Chemicals, Ltd.)
6) hesperidin sugar-adduct: aG-hesperidin PA-T (Toyo Sugar Refining Co., Ltd., Y/(X+Y)=0.33, R/Z=0.36)
[Evaluation of Samples]
Prepared test samples d1 to d8 and e1 to e8 were evaluated for color tone in the same way as samples of (1). Results are shown in Table 3.

TABLE 3

|  | Test sample | KCl | Flavonoid | Flavonoid skelton | Measured value (initial stage) (after 3 days) | Relative value (initial stage) (after 3 days) |
|---|---|---|---|---|---|---|
| Low-salt miso | d1 | 0% | 0% without additive(control) | — | 53.5<br>45.4 | 100<br>84.9 |
|  | d2 | 2% | Control | — | 53.4<br>45.2 | 99.8<br>84.5 |
|  | d3 | 2% | 0.4% catechin | Flavanol | 40.0<br>37.1 | 74.8<br>69.3 |
|  | d4 | 2% | 0.4% rutin | flavonol | 55.0<br>47.8 | 102.8<br>89.3 |
|  | d5 | 2% | 0.4% quercetin | flavonol | 58.3<br>50.9 | 109.0<br>95.1 |
|  | d6 | 2% | 0.4% chrysin | flavone | 55.4<br>48.2 | 103.6<br>90.1 |
|  | d7 | 2% | 0.4% hesperidin | flavanone | 53.1<br>45.7 | 99.3<br>85.4 |
|  | d8 | 2% | 0.4% hesperidin sugar-adduct | flavanone | 53.1<br>45.8 | 99.3<br>85.6 |
| Reduced-salt miso | e1 | 0% | 0% without additive(control) | — | 44.1<br>35.3 | 100<br>80 |
|  | e2 | 2% | Control | — | 43.7<br>35.5 | 99.1<br>80.5 |
|  | e3 | 2% | 0.4% catechin | Flavanol | 35.1<br>31.5 | 79.6<br>71.4 |
|  | e4 | 2% | 0.4% rutin | flavonol | 45.9<br>38.1 | 104.1<br>86.4 |
|  | e5 | 2% | 0.4% quercetin | flavonol | 49.5<br>42.4 | 112.2<br>96.1 |
|  | e6 | 2% | 0.4% chrysin | flavone | 46.0<br>38.0 | 104.3<br>86.2 |

TABLE 3-continued

|  |  |  |  | L value | |
|---|---|---|---|---|---|
| Test sample | KCl | Flavonoid | Flavonoid skelton | Measured value (initial stage) (after 3 days) | Relative value (initial stage) (after 3 days) |
| e7 | 2% | 0.4% hesperidin | flavanone | 43.8<br>35.3 | 99.3<br>80.0 |
| e8 | 2% | 0.4% hesperidin sugar-adduct | flavanone | 43.5<br>35.5 | 98.6<br>80.5 |

As shown in Table 3, in cases of using a low-salt miso, test sample d2 (with potassium chloride) had almost the same L value as test sample d1 (without additive). In contrast, test sample d3 (with catechin) had a lower L value, which result shows an unfavorable promotion of coloring. Test samples d4 (with rutin), d5 (with quercetin), d6 (with chrysin), d7 (with hesperidin), and d8 (with hesperidin sugar-adduct) had higher L values than that of test samples d1 and d2 (controls), which results show prevention of coloring favorably.

In cases of using a reduced-salt miso, test sample e1 (without additive) and test sample e2 (with potassium chloride) had almost the same L value as each other. In contrast, test sample e3 (with catechin) had a lower L value, which result show an unfavorable promotion of coloring. Test samples e4 (with rutin), e5 (with quercetin), e6 (with chrysin), e7 (with hesperidin), and e8 (with hesperidin sugar-adduct) had higher L values than that of test samples d1 and d2, which results show prevention of coloring favorably.

Results show that addition of catechin of a typical flavonoid (flavanol skeleton) darkened color of miso, resulting in a decreased L value. Addition of a specific flavonoid (having a flavonol, flavone, or flavanone), on the other, prevented an L value of miso from decreasing, while the miso contained the flavonoid, resulting in a good color tone.

(4) Test Samples f1 to f2, g1 to g6, and h1 to h2

[Preparation of Samples]

The following misos and flavonoids were mixed in amounts shown in Table 4 and kneaded with a spature to prepare test samples f1 to f2, g1 to g6, and h1 to h2.

Miso
    reduced-salt miso: Oisiku Enbun ½ Miso (Marukome Co., Ltd.)
    low-salt miso: Usushio Akadashi (Ichibiki Co., Ltd.)
    normal miso: Ryoutei No Aji Dashiiri Miso (Marukome Co., Ltd.)

Flavonoids
1) hesperidin sugar-adduct: aG-hesperidin PA-T (Toyo Sugar Refining Co., Ltd., Y/(X+Y)=0.33, R/Z=0.36)
2) catechin: Teafuran 90S (Ito En Ltd.,)
3) hesperidin: hesperidin (Hamari Chemicals, Ltd.)
4) quercetin: quercetin dihydrate (Wako Pure Chemical Industries, Ltd.)

[Evaluation of Samples]

Each 18 g of test samples and each 160 g of hot water were mixed and stirred to prepare miso soup. The resultant miso soup was subjected to a sensory evaluation for taste. Results are shown in Table 4.

TABLE 4

|  | Test sample | Flavonoid | Taste evaluation (miso soup) |
|---|---|---|---|
| Low-salt miso | f1 | 0% without additive (control) | Bland, samll tasty thickness, remaining an acidic taste. |
|  | f2 | 0.3% hesperidin sugar-adduct | Enhanced tasty thickness and body. Having mild taste. |
| Reduced salt miso | g1 | 0% without additive (control) | Slightly light salty taste. having a specific body and flavor for |
|  | g2 | 0.4% catechin | recognized astringent taste and harsh taste. A reduced specific flavor for akadashi. |
|  | g3 | 0.3% hesperidin sugar-adduct | Longer lasting body in an after taste. An enhanced specific flavor for akadashi. |
|  | g4 | 0.4% hesperidin sugar-adduct | Longer lasting body in the total taste. An enhanced specific flavor for akadashi. An enriched taste. |
|  | g5 | 0.4% hesperidin | Longer lasting body in the total taste. An enhanced specific flavor for akadashi. An enriched taste. |
|  | g6 | 0.3% quercetin | an enhanced first taste. really strong tasty thickness in the first taste. an enriched taste. |
| Normal miso | h1 | 0% without additive (control) | having a soup stock taste. an umami taste and a following acidic taste, discretely recognized. an unintegrated taste. |
|  | h2 | 0.3% hesperidin sugar-adduct | an increased soup stock taste. totally very integrated body and taste. |

As shown in Table 4, compared with test sample f1 of the reduced-salt miso without additive (control), test sample f2 with the hesperidin sugar-adduct had a thick taste, an enriched body and a mild good taste on the whole.

Similarly as above, compared with test sample g1 of the low-salt miso without additive (control), test samples g3 and g4 with the hesperidin sugar-adduct each had an enhanced body and flavor specified for akadashi miso and an enriched good taste. Test sample g5 (with hesperidin) also had an enhanced body and flavor specific for akadashi miso and an enriched good taste. Test sample g6 (with quercetin) had a stronger first taste (mouth feeling at the start of eating) and thickness (richness) of a taste in the first half of eating was enhanced. In contrast, test sample g2 (with catechin) exhibited offensive tastes such as astringent taste and a reduced flavor specific for akadashi miso, which was unfavorable.

Particularly in cases of the normal miso (containing a soup stock), compared with test sample h1 without additive (control), test sample h2 (with hesperidin sugar-adduct) had a longer lasting taste of the soup stock, produced miso soup having a much better integrated and enriched taste, and had an enriched good taste.

As described above, addition of a specific flavonoid produced miso having an enhanced miso body and taste without impairing miso original taste, having a more integrated and enriched good taste.

(5) Test Samples i1 to i2 and j1 to j4

[Preparation of Samples]

The following misos and flavonoids were mixed in amounts shown in Table 5 and kneaded with a spature to prepare test samples i1 to i2 and j1 to j4.

Miso
 reduced-salt miso: Oisiku enbun ½ miso (Marukome Co., Ltd.)
 low-salt miso: Usushio Akadashi (Ichibiki Co., Ltd.)

Potassium Chloride
 potassium chloride (Wako Pure Chemical Industries, Ltd.)

Flavonoids
1) hesperidin sugar-adduct: aG-hesperidin PA-T (Toyo Sugar Refining Co., Ltd., Y/(X+Y)=0.33, R/Z=0.36)
2) hesperidin: hesperidin (Hamari Chemicals, Ltd.)
3) quercetin: quercetin dihydrate (Wako Pure Chemical Industries, Ltd.)

[Evaluation of Samples]

Each 18 g of test samples and each 160 g of hot water were mixed and stirred to prepare miso soup. The resultant miso soup was subjected to a sensory evaluation for taste. Results are shown in Table 5.

TABLE 5

| | Test sample | KCl | Flavonoid | Taste evaluation (miso soup) |
|---|---|---|---|---|
| Reduced salt miso | i1 | 2% | 0% control | an increased salty taste with KCl. having offensive tastes (bitter taste, harsh taste) of K. |
| | i2 | 2% | 0.5% hesperidin sugar-adduct | an increased salty taste with KCl. having smaller offensive tastes of K. enhanced tasty thickness and |
| Low-salt miso | j1 | 1% | 0% control | an increased salty taste with KCl. lasting offensive tastes of K. |
| | j2 | 1% | 0.5% hesperidin sugar-adduct | an increased salty taste with KCl. having smaller offensive tastes of K. long lasting umami taste and enhanced body. |
| | j3 | 1% | 0.4% hesperidin | an increased salty taste with KCl. having smaller offensive tastes of K. a totally integrated taste and an enhanced enrichness. |
| | j4 | 1% | 0.2% quercetin | an increased salty taste with KCl. having smaller offensive tastes of K. a totally integrated taste and an enhanced first taste. |

As shown in Table 5, compared with test sample i1 of the reduced-salt miso with only potassium chloride, test sample i2 with potassium chloride and the hesperidin sugar-adduct had reduced offensive tastes (bitter taste, harsh taste), derived from potassium chloride, a totally enriched body and a good taste.

In cases of the low-salt miso, compared with test sample j1 with only potassium chloride, test sample j2 with potassium chloride and the hesperidin sugar-adduct had reduced offensive tastes, derived from potassium chloride, a longer lasting umami taste, an enhanced body, and a good taste. Test sample j3 (with hesperidin) similarly had reduced offensive tastes, derived from potassium chloride, a longer lasting umami taste, an enhanced body, and an enriched good taste. Test sample j4 (with quercetin) had a stronger first taste and thickness (richness) of a taste in the first half of eating was enhanced.

Results showed that addition of a specific flavonoid reduced offensive tastes, derived from potassium chloride, and produced miso having an enhanced body, an imparted richness, and a good taste without impairing miso original taste.

(6) Test Samples k1 to k2

100 g of test sample i2 was prepared and filled in an aluminium pouch. The pouch was sealed with a heat sealer to produce a packaged miso (test sample k1). Test sample j4 was similarly prepared to give a packaged miso (test sample k2).

(7) Test samples 11 to 13

[Preparation of Samples]

The following miso and anthocyanins were mixed in amounts shown in Table 6 and kneaded with a spature to prepare test samples 11 to 13.

Miso
 normal miso: Shinsyu-Ichi Miso Miko-Chan Jirushi (Miyasaka Brewery Co., Ltd.)

Anthocyanins
1) hesperidin: hesperidin (Hamari Chemicals, Ltd.)
2) purple sweet potato pigment: Sun Red YMF (San-Ei Gen F.F.I., Inc.)
3) elderberry pigment: elderberry pigment (Biocon Japan Ltd.)

2) phosphoric acid: phosphoric acid (Wako Pure Chemical Industries, Ltd., purity 85%)

[Evaluation of Samples]

Prepared test samples m1 to m9 were evaluated for color tone in the same way as samples of (1). Results are shown in Table 7.

TABLE 7

|  | Test sample | Flavonoid | Phosphoric compound | L value Measured value (initial stage) (after 3 days) | L value Relative value (initial stage) (after 3 days) |
|---|---|---|---|---|---|
| Normal miso | m1 | 0% without additive (control) | — | 56.7<br>48.4 | 100<br>85.4 |
|  | m2 | 0% without additive | 0.2% phytic acid (purity 0.1%) | 57.1<br>49.4 | 100.7<br>87.1 |
|  | m3 | 0% without additive | 0.2% phosphoric acid (puritu 0.17%) | 56.5<br>49.2 | 99.6<br>86.8 |
|  | m4 | 0.4% rutin | — | 60.1<br>52.4 | 106<br>92.4 |
|  | m5 | 0.4% rutin | 0.2% phytic acid (purity 0.1%) | 60.7<br>53.7 | 107.1<br>94.7 |
|  | m6 | 0.4% rutin | 0.2% phosphoric acid (purity 0.17%) | 60.0<br>53.1 | 105.8<br>93.7 |
|  | m7 | 0.5% rutin sugar-adduct | — | 52.5<br>46.1 | 92.6<br>81.3 |
|  | m8 | 0.5% rutin sugar-adduct | 0.2% phytic acid (purity 0.1%) | 55.5<br>48.8 | 97.9<br>86.1 |
|  | m9 | 0.5% rutin sugar-adduct | 0.2% phosphoric acid (purity 0.17%) | 54.5<br>48.4 | 96.1<br>85.4 |

[Evaluation of Samples]

Prepared test samples l1 to l3 were evaluated for color tone at the initial stage in the same way as samples of (1). Results are shown in Table 6.

TABLE 6

|  | Test sample | Anthocyanin etc. | L value (initial stage) |
|---|---|---|---|
| Normal miso | l1 | 0.3% hesperidin | 54.5 |
|  | l2 | 0.3% purple sweet potato pigment | 47.7 |
|  | l3 | 0.3% elderberry pigment | 31.2 |

As shown in Table 6, test samples l2 (with purple sweet potato pigment) and l3 (with elderberry pigment) had lower values than test sample l1 (with hesperidin). Results show that addition of an anthocyanin darkened color of miso. Addition of an anthocyanin was thus found not to provide a desired effect.

(8) Test Samples m1 to m9

[Preparation of Samples]

The following miso, flavonoids, and phosphoric compounds were mixed in amounts shown in Table 7 and kneaded with a spature to prepare test samples m1 to m9.

Miso
  normal miso: Shinsyu-Ichi Miso Miko-Chan Jirushi (Miyasaka Brewery Co., Ltd.)
Flavonoid
1) rutin: rutin trihydrate (Wako Pure Chemical Industries, Ltd.)
2) rutin sugar-adduct: aG-rutin PS (Toyo Sugar Refining Co., Ltd., purity 42%, Y/(X+Y)=0, R/Z=0.34)
Phosphoric Compound
1) phytic acid: phytic acid (Wako Pure Chemical Industries, Ltd., purity 50%)

As shown in Table 7, test sample m4 (with rutin) had a higher L value than test sample m1 (without additives). Test samples m5 (with rutin+phytic acid) and m6 (with rutin+phosphoric acid) also had higher L values.

In contrast, test sample m7 (with rutin sugar-adduct) had lower L values than that of test sample m1. However, test samples m8 (with rutin sugar-adduct+phytic acid) and m9 (with rutin sugar-adduct+phosphoric acid) had L values equal to or higher than that of test sample m1.

Results show that combined use of a flavonoid and a phosphoric compound enhanced the effect of preventing of coloring.

The invention claimed is:

1. Miso, comprising a flavonoid substance having a flavanone skeleton, in an amount of 0.01 to 5% by weight, wherein the miso is a product of fermentation with a koji mold.

2. The miso according to claim 1, wherein the flavonoid substance comprises a flavonoid glycoside.

3. The miso according to claim 1, wherein the flavonoid substance is at least one compound selected from the group consisting of naringin, naringenin, eriodictyol, eriocitrin, neoeriocitrin, sugar-adducts thereof, and sugar-hydrolysates thereof.

4. The miso according to claim 1, wherein the flavonoid substance is at least one compound selected from the group consisting of hesperidin, methylhesperidin, neohesperidin, diosmin, hesperetin, sugar-adducts thereof, and sugar-hydrolysates thereof.

5. The miso according to claim 1, which is packaged in a container.

6. The miso according to claim 1, further comprising water in an amount of 30 to 50% by weight.

7. The miso according to claim 1, further comprising water in an amount of 2 to 7% by weight.

8. Miso comprising:
0.01 to 5 weight % of flavonoid substance having a flavanone skeleton;
0.4 to 8 weight % of sodium:
0.4 to 10 weight % of potassium; and
30 to 50 weight % of water.

9. The miso according to claim 8, wherein the flavonoid substance comprises a flavonoid glycoside.

10. The miso according to claim 8, wherein the flavonoid substance is at least one compound selected from the group consisting of rutin, naringin, naringenin, eriodictyol, eriocitrin, neoeriocitrin, sugar-adducts thereof, and sugar-hydrolysates thereof.

11. The miso according to claim 8, wherein the flavonoid substance is at least one compound selected from the group consisting of hesperidin, methylhesperidin, neohesperidin, diosmin, hesperetin, sugar-adducts thereof, and sugar-hydrolysates thereof.

12. The miso according to claim 8, which is packaged in a container.

* * * * *